United States Patent Office 3,437,665
Patented Apr. 8, 1969

3,437,665
PROCESS FOR PREPARING 1-ARYL-5-CHLORO-1H-TETRAZOLE
Cataldo A. Maggiulli, Rochester, and Raymond E. Paine, Hilton, N.Y., assignors to Eastman Kodak Company, Rochester, N.Y., a corporation of New Jersey
No Drawing. Filed Oct. 26, 1964, Ser. No. 406,556
Int. Cl. C07d 55/56; G03c 1/34
U.S. Cl. 260—308          6 Claims

ABSTRACT OF THE DISCLOSURE

Certain 1-aryl-5-halo-1H-tetrazoles are produced by reacting an arylisocyanodihalide with hydrazoic acid or a salt thereof. These compounds are useful in preparing corresponding 5-substituted tetrazoles by reaction with nucleophilic reagents.

This invention relates to the preparation of substituted 1H-tetrazoles and to certain novel 1-aryl-5-substituted-1H-tetrazoles.

The method of our invention produces 1-aryl-5-halo-1H-tetrazoles by the reaction of an arylisocyanodihalide with hydrazoic acid or an ammonium, alkali metal, or alkaline earth metal salt thereof, as illustrated by the following equation:

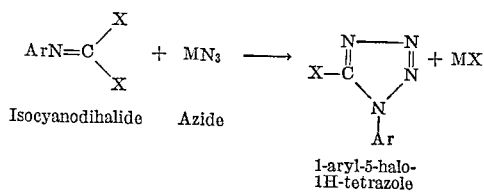

wherein Ar is an aryl radical, M is hydrogen, ammonium, an alkali metal, or an alkaline earth metal and X is a halogen atom.

The 1-aryl-5-halo-1H-tetrazoles have an active halogen atom that readily undergoes replacement. Consequently, they are valuable as chemical intermediates for the preparation of a generic family of 1-aryl-5-substituted-1H-tetrazoles of the following formula:

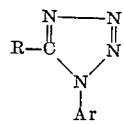

In this formula Ar is aryl, as previously indicated, and R can be the residue of any compound that undergoes a displacement reaction with the active halogen of the tetrazole, e.g., a nucleophilic reagent that reacts with the halogen, eliminating hydrogen halide or metal halide. Thus R can be any of such radicals as —OH, —O—alkyl, —O—aryl, —SH, —S—alkyl, —S—aryl, —NH₂, —NHR, —NR₂, —NHNH₂, —NHNR₂, —N₃, or the like, as present for example in the corresponding amines, hydrazines, etc., or the alkali metal salts of the neutral or acidic compounds such as water, alcohols, thiols, phenols, etc.

Certain members of this family of tetrazoles, notably those substituted in the 5-position by —SH, —OH, and —NH₂, have been shown to exist in the solid state in the tautomeric keto or imino form. (Wilson et al., J. Org. Chem. 24, 1046–51 [1959].) Thus, 5-mercapto-1-phenyl-1H-tetrazole can be more properly described as 1-phenyl-2-tetrazoline-5-thione. This tautomeric relationship is pertinent to certain of the working examples hereinafter. When we name such a compound by one of its tautomeric forms, we mean to designate the compound capable of existing in such form although under different conditions it may exist in the other form or as a mixture of the desmotropes.

5-chloro-1-phenyl-1H-tetrazole has been disclosed by Stolle et al., J. prack. Chem. 134, 282 (1932). It was prepared by a synthesis involving the diazotization of 5-amino-1-phenyl-1H-tetrazole, a procedure over which our method of preparation has several advantages, including simplicity, rapidity and superior yields. To the best of our knowledge, the other 5-halo-1-aryl-1H-tetrazoles, as prepared by the method of our invention are new compounds. They are useful as chemical intermediates for the various 1-aryl-5-substituted-1H-tetrazoles indicated above. A number of the latter, as indicated hereinafter, are also new compounds. They are useful as addenda for silver halide photographic emulsions, particularly as antifoggants, the 5-mercapto species being preferred among the various 1-aryl-5-substituted-1H-tetrazoles for this use. The 5-azido species are useful as catalysts for photo-polymerization of substances such as cyclized natural rubber, e.g., in the manner disclosed in U.S. 2,852,379.

Our method of producing 1-aryl-5-halo-1H-tetrazoles offers a simple, economical and rapid reaction that gives the desired products in excellent yields. These products are then valuable intermediates by a simple replacement reaction, for a wide range of 1-aryl-5-substituted-1H-tetrazoles many of which are new compounds or were obtainable previously only by complex and unsatisfactory methods of synthesis.

The compounds and method of the invention are illustrated by the following examples.

EXAMPLE 1

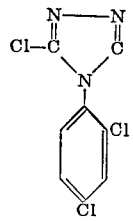

1-(2,4-dichlorophenyl)-5-chloro-1H-tetrazole. — In a 1-l. flask fitted with stirrer, reflux condenser and thermometer 25 g. (0.383 mole) of sodium azide is dissolved in 120 ml. of water by stirring at room temperature until complete solution is obtained. To the sodium azide solution is added a solution containing 93 g. (0.383 mole) of 2,4-dichlorophenylisocyanodichloride dissolved in 300 ml. of acetone. The temperature of the reaction mixture rises from 25° C. to 50° C. It is stirred at this temperature for 15 minutes, then heated to reflux for one-half hour. The reaction mixture is cooled and drowned in an equal volume of water. The mixture is stirred one-half hour, the product is collected by suction filtration and dried.

There is obtained 95 g. of crude 1-(2,4-dichlorophenyl)-5-chloro-1H-tetrazole having a melting point of 73–8° C., which is 99% of the theoretical yield. On recrystallization from methanol this sample had a melting point of 78–80° C. and the following elemental analysis: Calculated for $C_7H_3Cl_3N_4$: C, 33.7; H, 1.2; N, 22.5; Cl, 42.7. Found: C, 34.0; H, 1.1; N, 22.3; Cl, 42.8.

EXAMPLE 2

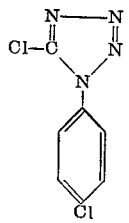

1-(p-chlorophenyl)-5-chloro-1H-tetrazole.—In the same manner 1-(p-chlorophenyl)-5-chloro-1H-tetrazole was prepared from p-chlorophenylisocyanodichloride and sodium azide in 96% yield. This compound had a melting point of 70–2° C. and the following elemental analysis: Calculated for $C_7H_4Cl_2N_4$: C, 39.1; H, 1.9; N, 26.0; Cl, 33.0. Found: C, 39.1; H, 1.9; N, 26.3; Cl, 32.8.

EXAMPLE 3

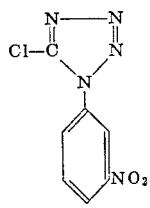

5-chloro-1-(m-nitrophenyl)-1H-tetrazole.—In the same manner 5-chloro-1-(m-nitrophenyl)-1H-tetrazole was prepared from m-nitrophenylisocyanodichloride and sodium azide in 95% yield. This compound had a melting point of 132° C. (dec.) and the following elemental analysis: Calculated for $C_7H_4ClN_5O_2$: C, 37.4; H, 1.8; N, 31.1; Cl, 15.7. Found: C, 37.7; H, 1.6; N, 31.1; Cl, 16.0.

The next example illustrates the utility of compounds of the invention as intermediates in the preparation of the tautomeric 1-aryl-2-tetrazoline-5-thiones.

EXAMPLE 4

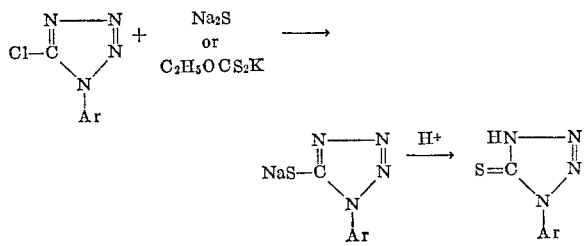

1-(p-chlorophenyl)-2-tetrazoline-5-thione.—In a 250 ml. flask equipped with a stirrer and reflux condenser are placed 10 g. (0.047 mole) of 5-chloro-1-(p-chlorophenyl)-1H-tetrazole and 60 ml. of methanol. When solution is complete 6 g. (0.05 mole) of potassium ethyl xanthate is added and the mixture refluxed for 2 hours. The mixture is cooled and 60 ml. of water is added. The solution is extracted with two 100 ml. portions of diethyl ether which is separated and discarded. The aqueous phase is acidified with hydrochloric acid until it is acid to Congo paper. The white solid which precipitates is collected by suction filtration and dried.

There is obtained 5 g. of white product having a melting point of 159° C. (dec.), which is 95% of the theoretical amount of 5.3 g. The following analysis was obtained: Calculated for $C_7H_5ClN_4S$: C, 39.6; H, 2.4; N, 26.4; Cl, 16.7; S, 15.1. Found: C, 40.0; H, 2.5; N, 26.1; Cl, 16.3; S, 14.7.

Also prepared in a similar manner were 1-(2,4-dichlorophenyl)-2-tetrazoline-5-thione (M.P. 126° C., dec.) and 1-(m-nitrophenyl)-2-tetrazoline-5-thione (M.P. 149° C.) in yields of 80–100% of theoretical. The best previous method for preparing this class of compounds consisted of reacting a substituted isothiocyanate with sodium azide, with yields of only about 40 to 50%.

The next example illustrates the use of compounds of the invention as intermediates for 1-aryl-2-tetrazoline-5-ones.

EXAMPLE 5

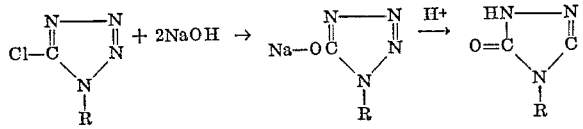

1-(m-nitrophenyl)-2-tetrazolin-5-one.—In a 250 ml. flask equipped with a stirrer and reflux condenser 11.25 g. (0.05 mole) of 5-chloro-1-(m-nitrophenyl)-1H-tetrazole is dissolved in 70 ml. of dioxane and a solution containing 5 g. (0.125 mole) of sodium hydroxide in 20 ml. of water is added. This mixture is refluxed for 1 hour, then poured into 200 ml. of cold water. The solution is extracted with two 100 ml. portions of diethyl ether, which is separated and discarded. The aqueous layer is acidified with hydrochloric acid to precipitate the product, which is collected by suction filtration and dried.

There is obtained 8.2 g. of crude product having a melting point of 166° C. (dec.), which is 80% of the theoretical amount of 10.3 g.

This material on further purification by recrystallization from methanol had a melting point of 177° C. and gave the following elemental analysis: Calculated for $C_7H_5N_5O_3$: C, 40.6; H, 2.4; N, 33.8. Found: C, 40.6; H, 2.5; N, 33.8.

Prepared in a similar manner from 5-chloro-1-(p-chlorophenyl)-1H-tetrazole was 1-(p-chlorophenyl)-2-tetrazolin-5-one (M.P. 206° C., dec.).

The next example illustrates the use of compounds of the invention in the preparation of 1-aryl-5-hydrazino-1H-tetrazoles.

EXAMPLE 6

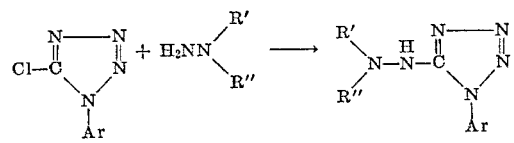

1-(2,4-dichlorophenyl)-5-hydrazino-1H-tetrazole.—In a 250 ml. flask fitted with a reflux condenser are placed 10 g. of 5-chloro-1-(2,4-dichlorophenyl)-1H-tetrazole and 100 ml. of 64% hydrazine in water. The mixture is heated to reflux for one hour, cooled, and drowned in water. The tan colored solid is collected by suction filtration and dried to yield 6 g. (60%) of product having a melting point of 161–3° C. and the following elemental analysis: Calculated for $C_7H_6Cl_2N_6$: C, 34.3; H, 2.45; N, 34.3; Cl, 28.9. Found: C, 34.6; H, 2.6; N, 34.1; Cl, 28.7.

Prepared in similar manner from 5-chloro-1-(m-nitrophenyl)-1H-tetrazole was 1-(m-nitrophenyl)-5-hydrazino-1H-tetrazole (M.P. 166° C., dec.). Previously, compounds of this series could be prepared only by indirect 3-step synthesis starting with the corresponding 1-aryl-2-tetrazoline-5-thione.

The next example illustrates the use of the compounds of the invention in the preparation of 1-aryl-5-azido-1H-tetrazoles. It also shows that the new compounds can be used as intermediates, with or without isolating the intermediate, as indicated by the two general equations of the example.

EXAMPLE 7

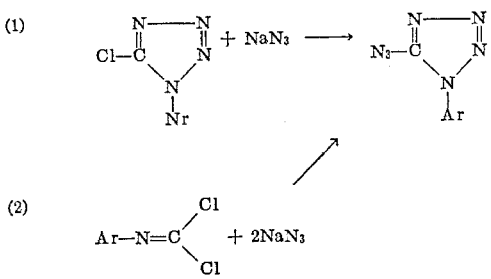

5-azido-1-(2,4-dichlorophenyl)-1H-tetrazole. — In a 250 ml. 3-necked flask fitted with stirrer, thermometer and reflux condenser are placed 6.7 g. (0.1 mole) of sodium azide and 25 ml. of water. The mixture is stirred until a complete solution is obtained. A solution containing 20 g. (0.82 mole) of 1-(2,4-dichlorophenyl)-5-chloro-1H-tetrazole dissolved in 100 ml. of acetone is added and the reaction mixture is refluxed for 1–2 hours. The reaction mixture is cooled, 100 ml. of cold water is added and the product is collected by suction filtration and dried.

There is obtained 16.5 g. of product having a melting point of 90–2° C. and the following elemental analysis: Calculated for $C_7H_3Cl_2N_7$: C, 32.8; H, 1.2; N, 38.3; Cl, 27.7. Found: C, 33.0; H, 1.0; N, 37.9; Cl, 27.3.

In a similar manner, in 92% yield, was obtained 5-azido-1-(m-nitrophenyl)-1H-tetrazole having a melting point of 131–2° C. and the following elemental analysis: Calculated for $C_7H_4N_8O_2$: C, 36.3; H, 1.7; N, 48.4. Found: C, 36.4; H, 1.6; N, 48.0.

A nearly quantitative yield of the above compound was also obtained by treating m-nitrophenylisocyanodichloride with two moles of sodium azide.

From 5-chloro-1-(p-chlorophenyl)-1H-tetrazole there was obtained 5-azido-1-(p-chlorophenyl)-1H-tetrazole having a melting point of 101–4° C. and the following elemental analysis: Calculated for $C_7H_4ClN_7$: C, 38.0; H, 1.8; N, 44.3; Cl, 16.0. Found: C, 37.9; H, 1.8; N, 43.9; Cl, 16.4.

The next example illustrates the use of compounds of the invention in the preparation of 1-aryl-5-alkoxy(or aryloxy)-1H-tetrazoles.

EXAMPLE 8

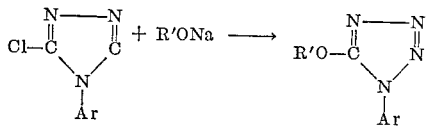

1-(2,4-dichlorophenyl)-5-methoxy-1H-tetrazole.—In a 250 ml. 3-necked flask, equipped with stirrer, thermometer and reflux condenser, 10 g. (0.04 mole) of 5-chloro-1-(2,4-dichlorophenyl)-1H-tetrazole is dissolved in 100 ml. of methanol. A solution containing 2.16 g. (0.04 mole) of sodium methoxide dissolved in 20 ml. of methanol is added and the reaction mixture is heated at reflux for 15 minutes. It is then cooled and drowned in an equal volume of water. The white product is collected by suction filtration and dried. There is obtained 9.0 g. having a melting point of 128–30° C., which represents 98% of the theoretical amount of 9.2 g. Calculated for $C_8H_6Cl_2N_4O$: C, 39.2; H, 2.45; N, 22.9; Cl, 28.9. Found: C, 37.8; H, 2.4; N, 23.0; Cl, 30.0.

1-(m-nitrophenyl)-5-methoxy-1H-tetrazole. — In the same manner 1-(m-nitrophenyl)-5-methoxy-1H-tetrazole is prepared from 5-chloro-1-(m-nitrophenyl)-1H-tetrazole. A quantitative yield of product is obtained having a melting point of 138–9° C. Calculated for $C_8H_7N_5O_3$: C, 43.4; H, 3.2; N, 31.6. Found: C, 43.9; H, 3.6; N, 31.4.

1-(m-nitrophenyl)-5-phenoxy-1H-tetrazole.—In a 250 ml. flask fitted with stirrer and reflux condenser are placed 9.4 g. (0.1 mole) of phenol, 120 ml. of benzene, 50 ml. of tetrahydrofuran and 5.4 g. (0.1 mole) of sodium methoxide. The mixture is refluxed ½ hour, then concentrated to dryness under vacuum. The solid residue is dissolved in 140 ml. of tetrahydrofuran and 22.5 g. (0.1 mole) of 5-chloro-1-(m-nitrophenyl)-1H-tetrazole is added. The mixture is heated at reflux for two hours. The solvent is removed by concentration under reduced pressure and the residual oil is drowned in 200 ml. of cold water. The product which solidifies is collected by suction filtration and dried. There is obtained 23 g. of product having a melting point of 103–6° C. which is 82% of theoretical amount of 28.3 g.

Recrystallization of this material raised the melting point to 113–5° C. The sample so treated had the following elemental analysis: Calculated for $C_{13}H_9N_5O_3$: C, 55.2; H, 3.2; N, 24.7. Found: C, 54.7; H, 3.0; N, 24.7.

The next two examples illustrate the preparation of 5-arylthio and 5-alkylamino tetrazoles.

EXAMPLE 9

1-(m-nitrophenyl)-5-phenylthio-1H-tetrazole. — In a 250 ml. flask equipped with a reflux condenser, stirrer and thermometer are placed 5.5 g. (0.05 mole) of benzenethiol and 60 ml. of tetrahydrofuran. To this is added slowly a solution containing 2.7 g. of sodium methoxide in 20 ml. of methanol. This mixture is heated at reflux for ½ hour then concentrated to dryness under vacuum. The solid residue is mixed with 70 ml. of tetrahydrofuran and 10.4 g. (0.05 mole) of 1-(m-nitrophenyl)-5-chloro-1H-tetrazole is added. The reaction mixture is heated at reflux for 1 hour then cooled and drowned in water. The product when dried and recrystallized from ethanol has a melting point of 125° C. (dec.) and weighs 11 g., which is 71.5% of the theoretical amount of 15.45 g. Calculated for $C_{13}H_9N_5O_2S$: C, 52.2; H, 3.0; N, 23.4; S, 10.7. Found: C, 52.2; H, 3.1; N, 23.2; S, 10.4.

EXAMPLE 10

1-(m-nitrophenyl)-5-(propylamino)-1H-tetrazole.—In a 100 ml. flask equipped with a reflux condenser are placed 30 ml. of propyl amine and 8.3 g. (0.04 mole) of 1-(m-nitrophenyl)-5-chloro-1H-tetrazole. These reactants are heated at reflux for one hour, after which the mixture is drowned in water.

This gives 8.0 g. of the above product having a melting point of 90–92° C., which represents 81% of the theoretical amount of 9.9 g. Calculated for $C_{10}H_{12}N_6O$: C, 48.4; H, 4.8; N, 33.9. Found: C, 48.2; H, 4.6; N, 33.8.

The compounds of the invention can be made from virtually any arylisocyanodihalide. The substituents Ar and X of the product derive from the arylisocyanodihalide. Therefore, Ar and X can be any aryl group and any halogen atom available from a arylisocyanodihalide. The preparation and a number of specific examples of arylisocyanodihalides is disclosed by Kuhle, Angew. Chemie, International Edition, 1, 647–652 (1962). The compounds are made by treatment of an N-formyl derivative of an aromatic amine with thionyl chloride and sulfuryl chloride. The aryl nucleus of the aromatic amine becomes the substituent Ar of the arylisocyanodihalide.

As explained by Kuhle, if the aromatic amine used in preparing the aromatic isocyanodichloride has any substituents that react with thionylchloride they will do so. These include substituents having labile hydrogen atoms, e.g., —$NH_2$, —OH, —COOH, —$CONH_2$, etc. For example, —COOH will be converted to —COCl. Accordingly, the aryl nucleus Ar of the isocyanodichloride will be free of substituents reactive with thionylchloride, not because such substituents are harmful to the reaction of the arylisocyanodihalide and the inorganic azide, but because such substituents are harmful to the reaction of stituents cannot normally be obtained.

Examples of preferred aryl groups Ar for the isocyanodihalide include phenyl, naphthyl, and any such aromatic nucleus having one to three substituents such as lower alkyl and alkoxy, e.g., of up to about 4 carbon atoms, halogen, nitro, cyano, lower alkylsulfonyl, mononuclear aryl and aryloxy, benzoyl, phenylazo, isocyanodichloride, lower alkoxycarbonyl, and the like. The method of the invention produces excellent results when Ar is phenyl or a phenyl radical having one to three substituents such as lower alkyl, nitro, or halogen, particularly chlorine.

The following table lists a number of arylisocyanodichlorides that can be used in the method of the invention and illustrates the broad range of substituents that can be present on the aryl group, Ar.

Arylisocyanodichlorides

Phenyl isocyanodichloride
2-chlorophenyl isocyanodichloride
2,4-dichlorophenyl isocyanodichloride
2,5-dichlorophenyl isocyanodichloride
2-(methylsulfonyl)phenyl isocyanodichloride 4-(n-butylsulfonyl)phenyl isocyanodichloride
2,3-dichlorophenyl isocyanodichloride
3,4-dichlorophenyl isocyanodichloride
3,5-dichlorophenyl isocyanodichloride
2,4,5-trichlorophenyl isocyanodichloride
2-methyl-4-chlorophenyl isocyanodichloride
2-chloro-6-methylphenyl isocyanodichloride
2,4-dichloro-5-methylphenyl isocyanodichloride
2-methoxy-4-chlorophenyl isocyanodichloride
2-chloro-5-trifluoromethylphenyl isocyanodichloride
2-trifluoromethyl-4-chlorophenyl isocyanodichloride
2,6-diethyl-4-methylphenyl isocyanodichloride
2,6-diisopropylphenyl isocyanodichloride
4-fluorophenyl isocyanodichloride
4-bromophenyl isocyanodichloride
2,4-dibromophenyl isocyanodichloride
4-nitrophenyl isocyanodichloride
3-nitrophenyl isocyanodichloride
2-chloro-4-nitrophenyl isocyanodichloride
4-chloro-3-nitrophenyl isocyanodichloride
2-methyl-5-nitrophenyl isocyanodichloride
4-methyl-3-nitrophenyl isocyanodichloride
2-methoxy-5-nitrophenyl isocyanodichloride
4-methoxycarbonylphenyl isocyanodichloride
4-(chloroformyl)phenyl isocyanodichloride
2,5-dichloro-4-nitrophenyl isocyanodichloride
1,4-phenylene-bis(isocyanodichloride)
Azobenzene-4-isocyanodichloride
Di-(4-chlorophenyl)-ether-2-isocyanodichloride
Benzophenone-4-isocyanodichloride
Phenylsulfone-2-isocyanodichloride
Diphenyl-2-isocyanodichloride
1-naphthyl isocyanodichloride In our working examples we have shown that an inert solvent is normally employed in preparing the compounds of the invention. The solvent can be any liquid that will dissolve the arylisocyanodichloride without reacting with it. Any reaction medium that will permit the arylisocyanodichloride to come in contact and react with the alkali metal azide will suffice. Therefore the latter can be used in solution or as a slurry. The solvents can be water-miscible solvents such as acetone, dioxane, tetrahydrofuran, etc. or water-immiscible such as ligorine, n-heptane, benzene, toluene, etc.

The examples have also shown that the preparation of the new compounds can be accomplished simply by mixing the reactants at room temperature. The reaction will proceed at lower temperatures, but, preferably, the reaction mixture is heated, e.g., to reflux temperature, to increase the reaction rates.

Normally, the isocyanodihalide and the azide are employed in equimolar ratios. An excess of the isocyanodihalide can be used if desired although there is no advantage in doing so. If an excess of the azide is used the product will be at least partially a 5-azido derivative as in Example 7. Therefore, unless the azido derivative is desired it is preferred not to use an excess of the azide so as to simplify the purification of the desired product.

We have illustrated the preparation of our compounds by the use of an alkali metal azide, i.e., sodium azide. However, other azides can be used equally as well. In general, we can employ such inorganic azides as hydrazoic acid; ammonium azide; the alkali metal azides, e.g., sodium, potassium, lithium, cesium or rubidium azide; or the alkaline earth metal azides such as magnesium, calcium or barium azide. For example we have prepared 1-(p-chlorophenyl)-5-chloro-1H-tetrazole in the manner of Example 2 but substituting cesium azide and rubidium azide for sodium azide. In each instance the yields and the quality of the product were approximately the same as in Example 2.

Although the invention has been described in considerable detail with particular reference to certain preferred embodiments thereof, it will be understood that variations and modifications can be effected within the spirit and scope of the invention as described hereinabove, and as defined in the appended claims.

We claim:
1. The method of preparing 1-aryl-5-chloro-1H-tetrazoles which comprises reacting an arylisocyanodichloride with an alkali metal azide, wherein equal molar amounts of the reactants are employed and wherein aryl represents a member selected from the group consisting of phenyl, naphthyl and a phenyl nucleus substituted with a member selected from the group consisting of chloro, nitro and lower alkyl.
2. The method in accordance with claim 1 wherein the reaction is carried out in the presence of an inert solvent.
3. The method in accordance with claim 1 wherein the alkali metal azide is sodium azide.
4. The method of preparing 1-(p-chlorophenyl)-5-chloro-1H-tetrazole which comprises heating a mixture of an aqueous solution of sodium azide and a solution of p-chlorophenylisocyanodichloride in an inert solvent in an equimolar ratio of the reactants.
5. The method of preparing 1-(2,4-dichlorophenyl)-5-chloro-1H-tetrazole which comprises heating a mixture of an aqueous solution of sodium azide and a solution of 2,4-dichlorophenylisocyanodichloride in an inert solvent in an equimolar ratio of the reactants.
6. The method of preparing 1-(m-nitrophenyl)-5-chloro-1H-tetrazole which comprises heating a mixture of an aqueous solution of sodium azide and a solution of m-nitrophenylisocyanodichloride in an inert solvent in an equimolar ratio of the reactants.

References Cited
UNITED STATES PATENTS 2,386,869  10/1945  Kendall _____ 260—308

OTHER REFERENCES

Benson, Chemical Reviews, volume 41, pp. 12–16 and 43–45 (1947).

Lieber et al.: Chemical Abstracts, volume 53, p. 345 (1959).

Pelkis et al.: Mem. Inst. Chem., Acad. Sci. Ukrain. S.S.R., vol. 6, pp. 169 and 179–180 (1940).

Stolle et al.: Chemical Abstracts, vol. 26, p. 5565 (1932).

ALTON D. ROLLINS, Primary Examiner.

U.S. Cl. X.R.

260—566, 465, 205, 476, 544, 768; 96—109